US009047742B2

(12) United States Patent
Connell, II et al.

(10) Patent No.: US 9,047,742 B2
(45) Date of Patent: Jun. 2, 2015

(54) VISUAL SECURITY FOR POINT OF SALE TERMINALS

(75) Inventors: Jonathan H. Connell, II, Cortlandt-Manor, NY (US); Myron D. Flickner, San Jose, CA (US); Norman Haas, Mount Kisco, NY (US); Arun Hampapur, Norwalk, CT (US); Sharathchandra U. Pankanti, Darien, CT (US); Yashodhara M. Patnaik, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 12/436,831

(22) Filed: May 7, 2009

(65) Prior Publication Data

US 2010/0282841 A1 Nov. 11, 2010

(51) Int. Cl.
*G06F 17/00* (2006.01)
*G07G 1/12* (2006.01)
(Continued)

(52) U.S. Cl.
CPC ................ *G07G 1/12* (2013.01); *G07G 1/0018* (2013.01); *G07G 3/00* (2013.01)

(58) Field of Classification Search
CPC ....... G06Q 30/02; G07F 7/1008; G06K 17/00
USPC ............................ 235/375, 383, 385, 462.01
See application file for complete search history.

(56) References Cited

U.S. PATENT DOCUMENTS 4,323,772 A 4/1982 Serge
5,115,888 A * 5/1992 Schneider ...................... 186/61
(Continued)

FOREIGN PATENT DOCUMENTS

JP 07234971 A 9/1995
JP 07244782 A 9/1995
(Continued)

OTHER PUBLICATIONS

Yang, H-D et al., "Multiple Pedestrian Detection and Tracking based on Weighted Temporal Texture Features," IEEE Proceedings of the 17th International Conference on Pattern Recognition (ICPR'04), 4 pages.
(Continued)

*Primary Examiner* — Rafferty Kelly
(74) *Attorney, Agent, or Firm* — Matthew Chung; Keohane & D'Alessandro PLLC; Hunter E. Webb

(57) ABSTRACT

Under the present invention, item verification is automated and expedited. Specifically, items to be purchased can be scanned by the shopper using a barcode reader (e.g., a scanner), attached to or positioned near the checkout station. As items are scanned, they are identified based on their barcode, and added to an item list. Item verification can then be performed at checkout using imaging technology. Specifically, as items are scanned, an item verification unit will capture an appearance thereof (via a camera). Item verification software within the item verification unit will access a database that associates items with their images/appearances. The appearance will be compared for consistency to the identity as determined based on the scan. In general, the item verification unit is a separate unit from the cash register, but adapted to work in conjunction therewith (e.g., as a pluggable system, via wireless communication, etc.).

20 Claims, 3 Drawing Sheets

(51) Int. Cl.
*G07G 1/00* (2006.01)
*G07G 3/00* (2006.01)

(56) References Cited

U.S. PATENT DOCUMENTS

| | | | | |
|---|---|---|---|---|
| 5,331,455 | A | 7/1994 | Chang | |
| 5,467,403 | A | 11/1995 | Fishbine et al. | |
| 5,477,379 | A | 12/1995 | Chang | |
| 5,497,314 | A * | 3/1996 | Novak | 705/17 |
| 5,513,264 | A | 4/1996 | Wang et al. | |
| 5,583,686 | A | 12/1996 | Chen | |
| 5,609,223 | A | 3/1997 | Lizaka et al. | |
| 5,631,976 | A | 5/1997 | Bolle et al. | |
| 5,635,697 | A | 6/1997 | Shellhammer et al. | |
| 5,659,167 | A | 8/1997 | Wang et al. | |
| 5,763,864 | A | 6/1998 | O'Hagan | |
| 5,811,774 | A | 9/1998 | Ju et al. | |
| 5,815,200 | A | 9/1998 | Ju et al. | |
| 5,918,211 | A | 6/1999 | Sloane | |
| 6,064,469 | A | 5/2000 | Brownstein | |
| 6,122,409 | A | 9/2000 | Boggs et al. | |
| 6,287,299 | B1 | 9/2001 | Sasnett et al. | |
| 6,366,696 | B1 * | 4/2002 | Hertz et al. | 382/183 |
| 6,382,357 | B1 | 5/2002 | Morrison et al. | |
| 6,434,530 | B1 | 8/2002 | Sloane et al. | |
| 6,504,481 | B2 | 1/2003 | Teller | |
| 6,556,276 | B2 | 4/2003 | Staeheli et al. | |
| 6,606,171 | B1 | 8/2003 | Renk et al. | |
| 6,827,266 | B2 * | 12/2004 | Mergenthaler et al. | 235/462.14 |
| 6,853,400 | B1 | 2/2005 | Matama | |
| 6,991,158 | B2 | 1/2006 | Munte | |
| 7,068,842 | B2 | 6/2006 | Liang et al. | |
| 7,118,026 | B2 * | 10/2006 | Harris et al. | 235/375 |
| 7,124,058 | B2 | 10/2006 | Namaky et al. | |
| 7,159,770 | B2 | 1/2007 | Onozu | |
| 7,196,624 | B2 | 3/2007 | Teller | |
| 7,202,780 | B2 | 4/2007 | Teller | |
| 7,246,745 | B2 * | 7/2007 | Hudnut et al. | 235/383 |
| 7,334,729 | B2 | 2/2008 | Brewington | |
| 2001/0045463 | A1 | 11/2001 | Madding et al. | |
| 2002/0004404 | A1 | 1/2002 | Squibbs | |
| 2002/0070861 | A1 | 6/2002 | Teller | |
| 2002/0110374 | A1 | 8/2002 | Staeheli et al. | |
| 2002/0121547 | A1 | 9/2002 | Wieth et al. | |
| 2002/0161658 | A1 | 10/2002 | Sussman | |
| 2002/0194074 | A1 | 12/2002 | Jacobs | |
| 2003/0071725 | A1 | 4/2003 | Teller | |
| 2003/0113002 | A1 | 6/2003 | Philomin et al. | |
| 2004/0125396 | A1 | 7/2004 | Burke | |
| 2004/0262391 | A1 | 12/2004 | Harris et al. | |
| 2005/0096855 | A1 | 5/2005 | Teller | |
| 2005/0173527 | A1 | 8/2005 | Conzola | |
| 2005/0189411 | A1 | 9/2005 | Ostrowski et al. | |
| 2005/0189412 | A1 | 9/2005 | Hudnut et al. | |
| 2005/0200490 | A1 | 9/2005 | Teller | |
| 2005/0211771 | A1 | 9/2005 | Onozu | |
| 2005/0237213 | A1 | 10/2005 | Teller | |
| 2006/0022051 | A1 | 2/2006 | Patel et al. | |
| 2006/0047835 | A1 | 3/2006 | Greaux | |
| 2006/0131418 | A1 * | 6/2006 | Testa | 235/472.01 |
| 2006/0161390 | A1 | 7/2006 | Namaky et al. | |
| 2006/0179164 | A1 | 8/2006 | Katibian et al. | |
| 2006/0288133 | A1 | 12/2006 | Katibian et al. | |
| 2006/0290980 | A1 | 12/2006 | Terada | |
| 2007/0057049 | A9 * | 3/2007 | Kundu et al. | 235/383 |
| 2007/0107016 | A1 | 5/2007 | Angel et al. | |
| 2007/0107017 | A1 | 5/2007 | Angel et al. | |
| 2007/0107021 | A1 | 5/2007 | Angel et al. | |
| 2007/0279244 | A1 | 12/2007 | Haughawout et al. | |
| 2008/0059281 | A1 | 3/2008 | Tower et al. | |
| 2009/0060259 | A1 * | 3/2009 | Goncalves | 382/100 |

FOREIGN PATENT DOCUMENTS

| | | | |
|---|---|---|---|
| JP | 2007257412 | A | 10/2007 |
| JP | 2008003859 | A | 1/2008 |
| JP | 2009093289 | A | 4/2009 |
| TW | 200817929 | A | 4/2008 |
| TW | M340672 | | 9/2008 |

OTHER PUBLICATIONS

Hilton, A., "Towards Model-Based Capture of a Persons Shape, Appearance and Motion," IEEE International Workshop on Modeling People, Corfu, Greece, Sep. 20, 1999, 8 pages.
Chang, Y. et al., "People Identification with Limited Labels in Privacy-Protected Video," International Conference on Multimedia & Expo (ICME-06), Toronto, Ontario, Canada, Jul. 9-12, 2006, 4 pages.
Chen, C-Y et al., "Background Modeling and Object Tracking Using Multi-Spectral Sensors," VSSN'06, Oct. 27, 2006, Santa Barbara, California, pp. 27-34.
Essa, I., "Computers Seeing People," American Association for Artificial Intelligence, AI Magazine, Summer 1999, pp. 69-82.
U.S. Appl. No. 11/756,391, Office Action, Dec. 2, 2009, 11 pages.
U.S. Appl. No. 11/756,391, Final Office Action, May 6, 2010, 12 pages.
U.S. Appl. No. 11/756,391, Office Action, Mar. 12, 2012, 10 pages.
U.S. Appl. No. 11/756,391, Office Action, Aug. 15, 2012, 11 pages.
U.S. Appl. No. 11/756,391, Office Action, Jun. 14, 2013, 14 pages.
U.S. Appl. No. 11/756,391, Office Action, Oct. 29, 2013, 15 pages.
U.S. Appl. No. 11/756,391, Notice of Allowance, Mar. 20, 2014, 17 pages.
U.S. Appl. No. 11/756,382, Office Action, Sep. 29, 2010, 12 pages.
U.S. Appl. No. 11/756,382, Notice of Allowance, Mar. 24, 2011, 5 pages.
U.S. Appl. No. 11/782,173, Office Action, May 27, 2009, 9 pages.
U.S. Appl. No. 11/782,173, Office Action, Nov. 27, 2009, 8 pages.
U.S. Appl. No. 11/782,173, Examiner's Answer, Apr. 30, 2010, 11 pages.
U.S. Appl. No. 11/782,173, Notice of Allowance, May 24, 2013, 9 pages.

* cited by examiner

VISUAL SECURITY FOR POINT OF SALE TERMINALS

CROSS-REFERENCE TO RELATED APPLICATIONS

This application is related in some aspects to the commonly owned and co-pending application entitled "Smart Scanning System," filed May 31, 2007 and having U.S. patent application Ser. No. 11/756,391, the entire contents of which are herein incorporated by reference. This application also is related in some aspects to the commonly owned and co-pending application entitled "Portable Device-Based Shopping Checkout," filed May 31, 2007, and having U.S. patent application Ser. No. 11/756,382, the entire contents of which are herein incorporated by reference. This application is related in some aspects to the commonly owned and co-pending application entitled "Item Scanning System," filed Jul. 24, 2007, and which is assigned U.S. patent application Ser. No. 11/782,173, the entire contents of which are herein incorporated by reference.

FIELD OF THE INVENTION

The present invention generally relates to secure checkout transactions (e.g., retail transactions). Specifically, the present invention provides methods and systems to improve the security of secure checkout transactions for increased monetary loss prevention.

BACKGROUND OF THE INVENTION

Marketplace security has become a rising concern over recent years. Security and anti-theft concerns have only increased with the pervasiveness of scanners at checkout stations. It has become increasingly frequent for perpetrators to switch and/or alter barcodes so that an item can be obtained for a cheaper price. In addition, many retailers also utilize image capture devices to catch shoplifters. Unfortunately, current placement of image capture devices is either awkward, or of little use during the checkout process. Any current placement of image capture devices near checkout stations inevitably places them in the way of customer's arms, heads or bodies, creating opportunities for collisions, with damage to the person and/or the image capture devices. It also creates problems for the store, with regard to cleaning, theft, camera occlusions, etc.

SUMMARY OF THE INVENTION

Under the present invention, item verification is automated and expedited. Specifically, items to be purchased can be scanned by the shopper using a barcode reader (e.g., a scanner), attached to or positioned near the checkout station. As items are scanned, they are identified based on their barcode, and added to an item list. Item verification can then performed at checkout using imaging technology. Specifically, as items are scanned, an item verification unit will capture an appearance thereof (via a camera). Item verification software within the item verification unit will access a database that associates items with their images/appearances. The appearance will be compared for consistency to the identity as determined based on the scan. In general, the item verification unit is a separate unit from the cash register, but adapted to work in conjunction therewith (e.g., as a pluggable system, via wireless communication, etc.).

A first aspect of the present invention provides a secure checkout method, comprising: capturing at least one image of an item with an image capture device of an item verification unit, the item verification unit being configured to communicate with a point of sale terminal where the item is being checked-out; and processing the image using item verification software of the item verification unit, the processing comprising determining whether an identity of the item as determined based on a scan of a barcode associated with the item consistent with an appearance of the item as determined based on the at least one image.

A second aspect of the present invention provides a secure checkout system, comprising: a item verification unit configured to communicate with a point of sale terminal, the item verification unit comprising: an image capture device for capturing at least one image of an item being checked-out via the point of sale terminal; and item verification software configured to determine whether an identity of the item as determined based on a scan of a barcode associated with the item is consistent with an appearance of the item as determined based on the at least one image.

A third aspect of the present invention provides a computer readable medium containing a program product for secure checkout, the computer readable medium comprising program code for causing a computer to: receive at least one image of an item captured with an image capture device of an item verification unit, the item verification unit being configured to communicate with a point of sale terminal where the item is being checked-out; and process the image to determining whether an identity of the item as determined based on a scan of a barcode associated with the item is consistent with an appearance of the item as determined based on the at least one image.

A fourth aspect of the present invention provides a method for deploying a secure checkout system, comprising: deploying a computer infrastructure being operable to: receive at least one image of an item captured with an image capture device of an item verification unit, the item verification unit being configured to communicate with a point of sale terminal where the item is being checked-out; and process the image to determine whether an identity of the item as determined based on a scan of a barcode associated with the item is consistent with an appearance of the item as determined based on the at least one image.

BRIEF DESCRIPTION OF THE DRAWINGS

These and other features of this invention will be more readily understood from the following detailed description of the various aspects of the invention taken in conjunction with the accompanying drawings in which.

Figure 1:
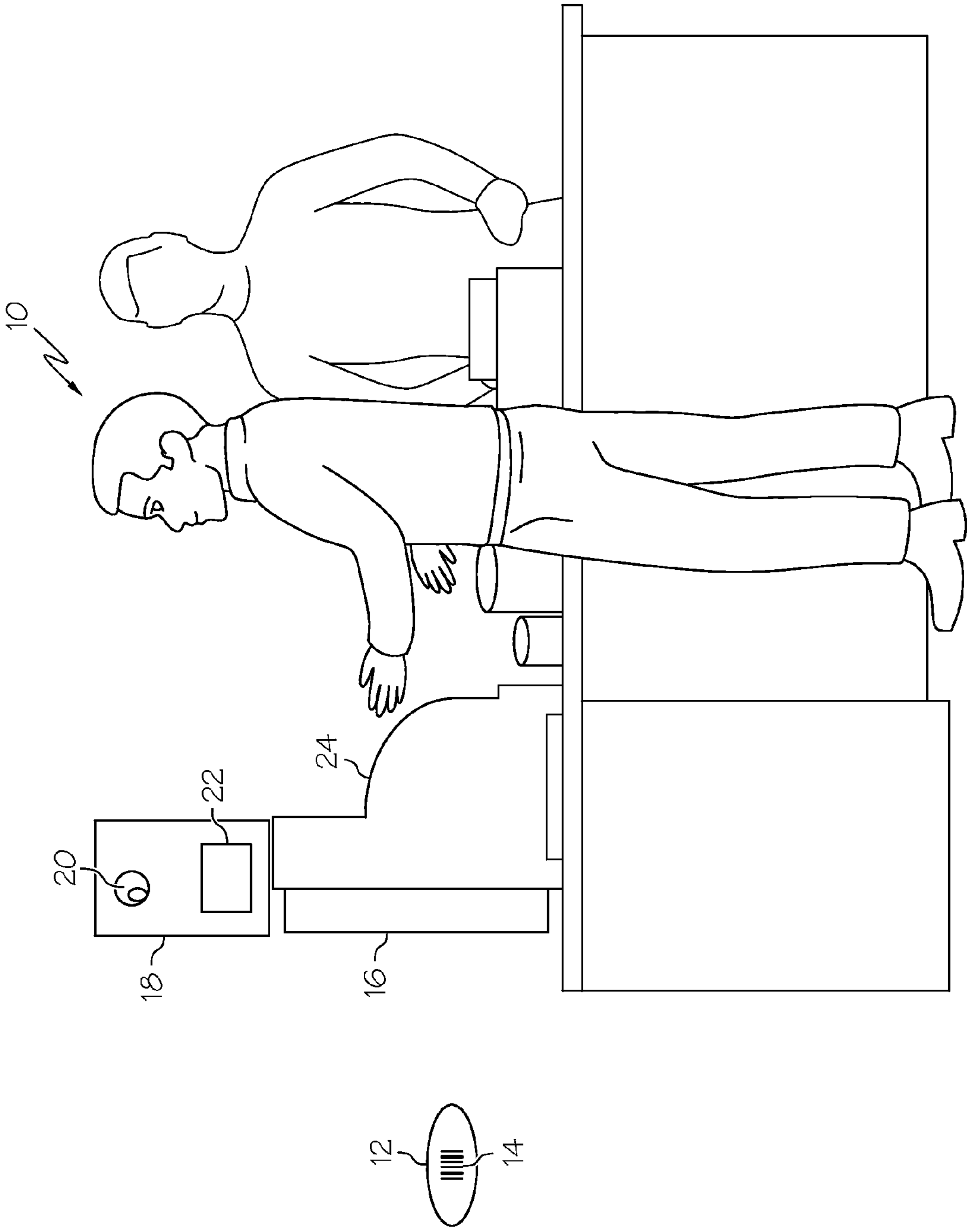
FIG. 1 depicts secure checkout systems according to one embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following Sections:

I. General Description

II. Computerized Implementation

As used herein, the following terms have the associated meanings:

"Set"—a quantity of at least one.

"Portable Device"—any wireless device such as a cellular telephone, personal digital assistant, etc., or any wired device capable of implementing the teachings given herein.

"Shopping Receptacle"—any container capable of holding items such as a shopping cart, a shopping basket, a shopping bag, etc.

"Image Capture Device"—means any type of camera or the like, such as a still image camera, a video camera, etc.

Under the present invention, item verification is automated and expedited. Specifically, items to be purchased can be scanned by the shopper using a barcode reader (e.g., a scanner), attached to or positioned near the checkout station. As items are scanned, they are identified based on their barcode, and added to an item list. Item verification can then performed at checkout using imaging technology. Specifically, as items are scanned, an item verification unit will capture an appearance thereof (via a camera). Item verification software within the item verification unit will access a database that associates items with their images/appearances. The appearance will be compared for consistency to the identity as determined based on the scan. In general, the item verification unit is a separate unit from the cash register, but adapted to work in conjunction therewith (e.g., as a pluggable system, via wireless communication, etc.).

Referring now to FIG. 1, secure checkout system 10 that provides visual security for point of sale according to one embodiment of the present invention is shown. Specifically, as items such as item 12 are selected by the purchaser, the barcode 14 printed on it can be scanned via barcode reader 16 of point of sale computer/terminal 24. At or around the same time, item 12 will be brought into the field of view of image capture device 20 of item verification unit. Image capture device 20 will capture at least one image of shopping cart and/or its items, and image item verification software 22 will filter and background artifacts (non-items such as the cart and anything in the background), to leave only the actual items intended to be purchased. The sequence of capturing and processing the image(s) by image item verification software 22 typically is as follows: wait for low motion in the field of view; take dark and bright pictures; segment items from the background; extract at least one visual feature of item 12 and determine the appearance of the items based on those visual features.

It should be understood that the appearance of items can be determined by image item verification software 22 cross-referencing a database of items using the captured image(s). In addition, the appearance can be as general or as specific as desired. For example, the appearance can be specific so as to identify the item (e.g., a bottle of X brand cola), or it can be more general (e.g., a bottle of cola, or just cola based on the color). Further, although identification of items was initially described herein as occurring upon being scanned, such identification would be determined at the computer/terminal 24. In such a case, the scanning would still occur as items are selected, which would result in storage of the barcodes. Then, the identification from the scanned barcodes would occur when the barcode reader was "synched" with the computer/terminal 24.

Regardless, image item verification software 22 will determine whether the appearance of the items as determined from the image(s) is consistent with their identities as determined from the barcode scan (e.g., did an item than scanned as a bottle of cola have an appearance of a DVD player). If there is an inconsistency, the discrepancy is registered, and a visual and/or audible alert is generated (e.g., to notify supervisory personnel). In any scenario, all events can be logged for future analysis.

In a typical embodiment, item verification unit 18 is a stand-alone unit that is attachable to the point of sale terminal. This avoids retrofitting existing cash register systems to incorporate item verification unit 18. Along these lines, item verification unit 18 can "plug" into the computer/terminal 24 (e.g., via USB connection), or communicate therewith wirelessly.

Figure 2:
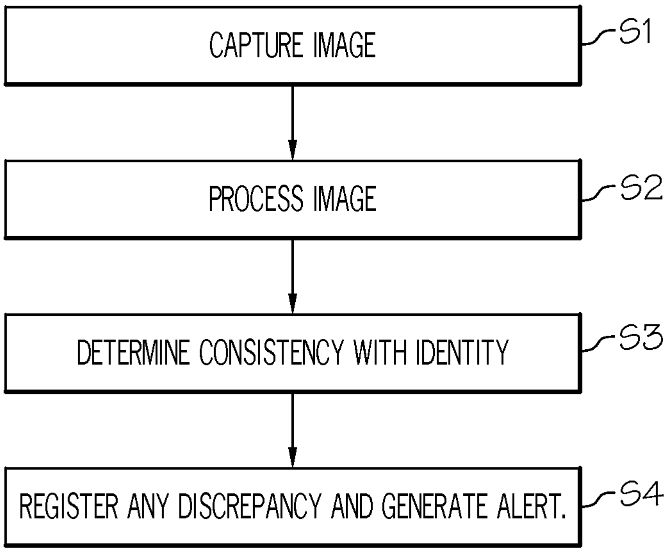
FIG. 2 depicts a method flow diagram according to the present invention

Referring now to FIG. 2, a method flow diagram according to the present invention is shown. As depicted, step S1 is to capture at least one image of an item with an image capture device of an item verification unit. Step S2 is to process the image using item verification software of the item verification unit. Step S3 is to determine whether an identity of the item as determined based on a scan of a barcode associated with the item is consistent with an appearance of the item as determined based on the at least one image. Step S4 is to register a discrepancy and generate an alert if an inconsistency exists.

II. Computerized Implementation

Figure 3:
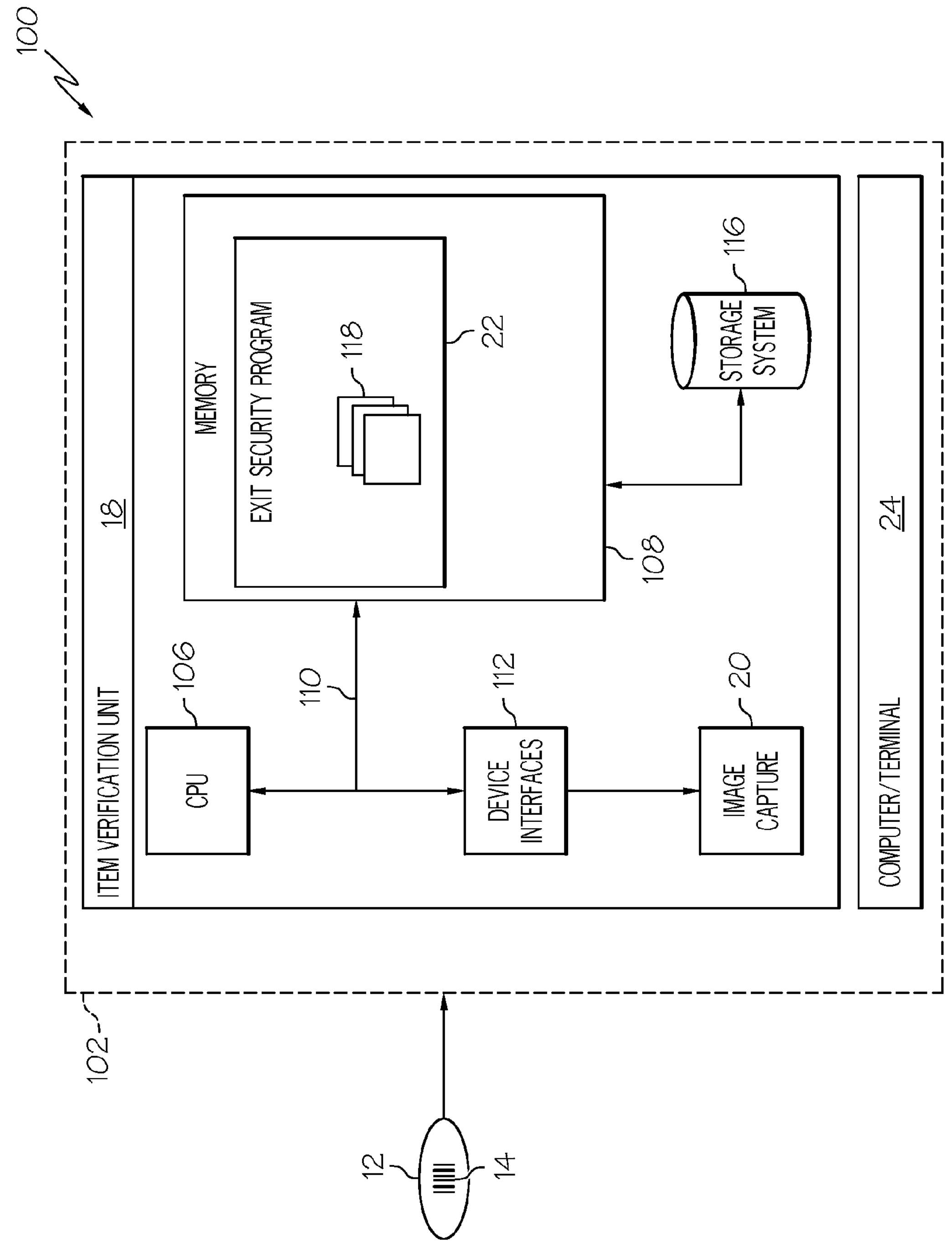
FIG. 3 depicts a more specific computerized implementation according to the present invention.

Referring now to FIG. 3, a computerized implementation 100 of the present invention is shown. As depicted, implementation 100 includes item verification system 18 and computer/terminal 24 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, item verification system 18 includes a processing unit 106, a memory 108, a bus 110, and device interfaces 112. Further, item verification system 18 is shown having image capture device 20 and storage system 116 that communicate with bus via device interfaces (although image capture device 20 alternatively could directly communicate with bus 110). In general, processing unit 106 executes computer program code, such as checkout software/program 24, which is stored in memory 108 and/or storage system 116. While executing computer program code, processing unit 106 can read and/or write data to/from memory 108, storage system 116, and/or device interfaces 112. Bus 110 provides a communication link between each of the components in item verification system 18. Although not shown, item verification system 18 could also include I/O interfaces that communicate with: one or more external devices such as a kiosk, a checkout station, a keyboard, a pointing device, a display, etc.); one or more devices that enable a user to interact with item verification system 18; and/or any devices (e.g., network card, modem, etc.) that enable item verification system 18 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, item verification system 18 is only representative of various possible computer systems that can include numerous combinations of hardware. To this extent, in other embodiments, item verification system 18 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 3 can be included in item verification system 18.

Storage system 116 can be any type of system capable of providing storage for information under the present invention such as item appearances. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into item verification system 18.

It should be understood that computer/terminal 24 will have components similar to those shown for item verification system 18. Such components are not shown for brevity purposes. In addition, storage system 116 is shown within item verification system 18. However, this need not be the case. Rather, storage system 116 could be external to and accessible by item verification system 18.

Shown in memory 108 of item verification system 18 is item verification software 22, with a set of modules 118. The modules 118 generally provide the functions of the present invention as described herein. Specifically (among other things), set of modules 118 is configured to: determine an appearance of the item 12 based on at least one image captured via image capture device 20; process the at least one image; determining whether identities of items based on the barcode scans are consistent with their appearances as determined from the image(s). Set of modules 118 can also be configured to: register discrepancies where items cannot be verified by their appearance, communicate notifications, etc.

While shown and described herein as visual security for point of sale, it is understood that the invention further provides various alternative embodiments. For example, in one embodiment, the invention provides a computer-readable/useable medium that includes computer program code to enable a computer infrastructure to provide visual security for point of sale. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 3) and/or storage system 116 (FIG. 3) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide visual security for point of sale. In this case, the service provider can create, maintain, support, etc., a computer infrastructure, such as computer infrastructure 102 (FIG. 3) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for visual security for point of sale. In this case, a computer infrastructure, such as computer infrastructure 102 (FIG. 3), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as item verification system 18 (FIG. 3), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A secure checkout method, comprising:

performing a scan of a barcode of an item being checked-out at a point of sale terminal, the point of sale terminal having a barcode scanner and a universal serial bus (USB) port;

determining an identity of the item based on the barcode;

capturing, as the item being checked out is brought into view of the image capture device, at least one image of the item with an image capture device of an item verification unit, the item verification unit being a portable, stand-alone, self-contained apparatus that is external to the point of sale terminal and being configured to be removably operatively connected with the USB port of the point of sale terminal and to communicate, via a universal serial bus, with the point of sale terminal where the item is being checked-out without retrofitting the point of sale terminal, the capturing including:

waiting for low motion in the field of view; and taking dark and bright pictures of the item being checked-out;

transmitting, from the point of sale terminal to the item verification unit via the USB connector, a list of identities of items being checked-out based on the barcode associated with each item being checked-out;

processing, on a processor of the item verification unit, the image to determine an identity of the captured image, the processing including:

extracting at least one visual feature of the item being checked out;

determining the appearance of the items based on those visual features; and cross-referencing a database of items using the captured image; and comparing, on the processor of the item verification unit, the identity of the captured image with the list of identities to determine whether the identity of the item as determined by the point of sale terminal based on the scan of the barcode associated with the item is consistent with the identity of the captured image based on an appearance of the item as determined by the item verification unit.

2. The secure checkout method of claim 1, further comprising receiving the scan via a barcode reader associated with the point of sale terminal.

3. The secure checkout method of claim 1, further comprising accessing a database that associates items with their images.

4. The secure checkout method of claim 1, the item verification unit being a stand-alone unit that is attachable to the point of sale terminal.

5. The secure checkout method of claim 1, further comprising registering a discrepancy with the item verification software if the identity is inconsistent with the appearance.

6. The secure checkout method of claim 5, providing a notification of the discrepancy with the item verification software, the notification being at least one of: a visual notification, and an audible notification.

7. The secure checkout method of claim 1, the image capture device being selected from a group consisting of a still image camera and a video camera.

8. A secure checkout system, comprising:

a point of sale terminal, the point of sale terminal having a barcode scanner and a universal serial bus (USB) port and being configured to perform a scan of a barcode of an item being checked-out and to determine an identity of the item based on the barcode;

an item verification unit, the item verification unit being a portable, stand-alone, self-contained apparatus that is external to the point of sale terminal and being configured to be removably operatively connected with the point of sale terminal without retrofitting the point of sale terminal, the item verification unit comprising:

a USB connector configured to removably operatively connect to the USB port of the point of sale terminal;

an image capture device for capturing, as the item being checked out is brought into view of the image capture device, at least one image of the item being checked-out via the point of sale terminal, the capturing including:

waiting for low motion in the field of view; and taking dark and bright pictures of the item being checked-out; and a processor and a memory having item verification software executed by the processor within the item verification unit and configured to:

receive, from the point of sale terminal via the USB connector, a list of identities of items being checked-out based on the barcode associated with each item being checked-out;

process the image to determine an identity of the captured image, the processing including:

extracting at least one visual feature of the item being checked out;

determining the appearance of the items based on those visual features; and cross-referencing a database of items using the captured image; and compare the identity of the captured image with the list of identities to determine whether the identity of the item as determined by the point of sale terminal based on the scan of the barcode associated with the item is consistent with the identity of the captured image based on an appearance of the item as determined by the item verification unit.

9. The secure checkout system of claim 8, the scan being capturing by a barcode reader associated with the point of sale terminal.

10. The secure checkout system of claim 8, the item verification software accessing a database that associates items with their images.

11. The secure checkout system of claim 8, the item verification unit a stand-alone unit that is attachable to the point of sale terminal as a stand.

12. The secure checkout system of claim 8, the item verification software being further configured to register a discrepancy if the identity is inconsistent with the appearance.

13. The secure checkout system of claim 12, the item verification software being further configured to provide a notification of the discrepancy, the notification being at least one of: a visual notification, and an audible notification.

14. The secure checkout system of claim 8, the image capture device being selected from a group consisting of a still image camera and a video camera.

15. A computer readable medium containing a program product for secure checkout, the computer readable medium comprising program code for causing a computer to:

perform a scan of a barcode of an item being checked-out at a point of sale terminal, the point of sale terminal having a barcode scanner and a universal serial bus (USB) port;

determine an identity of the item based on the barcode;

capture, as the item being checked out is brought into view of the image capture device, at least one image of the item captured with an image capture device of an item verification unit, the item verification unit being a portable, stand-alone, self-contained apparatus that is external to the point of sale terminal and being configured to be removably operatively connected with the USB port of the point of sale terminal and to communicate, via a universal serial bus, with the point of sale terminal where the item is being checked-out without retrofitting the point of sale terminal, the capturing including:

waiting for low motion in the field of view; and taking dark and bright pictures of the item being checked-out;

transmit, from the point of sale terminal to the item verification unit, via the USB connector, a list of identities of items being checked-out based on the barcode associated with each item being checked-out;

process, on a processor of the item verification unit, the image to determine an identity of the captured image, the processing including:

extracting at least one visual feature of the item being checked out;

determining the appearance of the items based on those visual features; and cross-referencing a database of items using the captured image; and compare, on the processor of the item verification unit, the identity of the captured image with the list of identities to determine whether the identity of the item as determined by the point of sale terminal based on the scan of the barcode associated with the item is consistent with the identity of the captured image based on an appearance of the item as determined by the item verification unit.

16. The computer readable medium containing the program product for secure checkout of claim 15, the computer readable medium further comprising program code for causing the computer to: receive the scan via a barcode reader associated with the point of sale terminal.

17. The computer readable medium containing the program product for secure checkout of claim 16, the computer readable medium further comprising program code for causing the computer to: access a database that associates items with their images.

18. The computer readable medium containing the program product for secure checkout of claim 16, the computer readable medium further comprising program code for causing the computer to: register a discrepancy with the item verification software if the identity is inconsistent with the appearance.

19. The computer readable medium containing the program product for secure checkout of claim 16, the computer readable medium further comprising program code for causing the computer to: provide a notification of the discrepancy with the item verification software, the notification being at least one of: a visual notification, and an audible notification.

20. A method for deploying a secure checkout system, comprising:

deploying a computer infrastructure being operable to:

perform a scan of a barcode of an item being checked-out at a point of sale terminal, the point of sale terminal having a barcode scanner and a universal serial bus (USB) port;

determine an identity of the item based on the barcode;

capture, as the item being checked out is brought into view of the image capture device, at least one image of the item captured with an image capture device of an item verification unit, the item verification unit being a portable, stand-alone, self-contained apparatus that is external to the point of sale terminal and being configured to be removably operatively connected with the USB port of the point of sale terminal and to communicate, via a universal serial bus, with the point of sale terminal where the item is being checked-out without retrofitting the point of sale terminal, the capturing including:

waiting for low motion in the field of view; and taking dark and bright pictures of the item being checked-out;

transmit, from the point of sale terminal to the item verification unit, via the USB connector, a list of identities of items being checked-out based on the barcode associated with each item being checked-out;

process, on a processor of the item verification unit, the image to determine an identity of the captured image, the processing including:

extracting at least one visual feature of the item being checked out;

determining the appearance of the items based on those visual features; and cross-referencing a database of items using the captured image; and compare, on the processor of the item verification unit, the identity of the captured image with the list of identities to determine whether the identity of the item as determined by the point of sale terminal based on the scan of the barcode associated with the item is consistent with the identity of the captured image based on an appearance of the item as determined by the item verification unit.

* * * * *